Patented Nov. 7, 1922.

1,434,484

UNITED STATES PATENT OFFICE.

DONALD M. CRIST, OF SANTA CRUZ, CALIFORNIA.

PROCESS OF PRODUCING IRON.

No Drawing. Application filed January 11, 1921. Serial No. 436,595.

*To all whom it may concern:*

Be it known that I, DONALD M. CRIST, a citizen of the United States, and a resident of Santa Cruz, county of Santa Cruz, and State of California, have invented a certain new and useful Process of Producing Iron, of which the following is a specification.

The invention relates to a process of producing iron from iron oxides.

An object of the invention is to provide a simple and inexpensive process of recovering iron from iron oxides such as hematite (ferric oxide) and magnetite (ferrosoferric oxide).

In accordance with my invention, the iron oxide is first ground to a finely divided condition, the grinding being preferably such that the ground product will pass a screen of approximately 100 apertures to the lineal inch. The ground oxide is then charged into a retort, which is then closed, and the material is heated in the closed retort to the temperature of dissociation of the iron oxide, which is approximately 650° centigrade. During the heating the retort is evacuated by a vacuum pump, or otherwise, to remove the air and the liberated oxygen from contact with the hot iron. After dissociation of the oxide is complete and the oxygen has been removed from the retort, the iron is allowed to cool below its critical temperature, or that temperature at which it will readily combine with oxygen and during this time the vacuum in the retort is maintained so that the iron is cooled out of contact with oxygen, resulting in substantially pure finely divided iron. After the iron particles have cooled sufficiently, they are discharged from the retort and compressed into billets or otherwise disposed of.

I claim:

1. The process of producing iron from iron oxide which comprises heating the oxide in a closed retort to a temperature sufficiently high to dissociate the oxide, removing air and liberated oxygen from contact with the heated mass and cooling the mass out of contact with oxygen.

2. The process of producing iron from iron oxide which comprises heating the oxide in a closed retort to a temperature sufficiently high to dissociate the oxide, removing air and liberated oxygen from the retort so that the highly heated mass is not in contact with oxygen and cooling the mass to below the temperature at which it will readily combine with oxygen, out of contact with oxygen.

In testimony whereof, I have hereunto set my hand.

DONALD M. CRIST.